(No Model.)
C. C. BRADLEY.
VEHICLE SPRING.
No. 294,190. Patented Feb. 26, 1884.
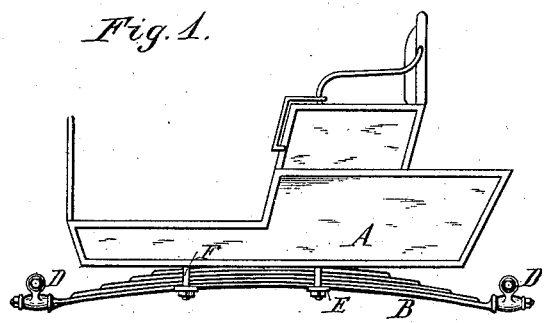
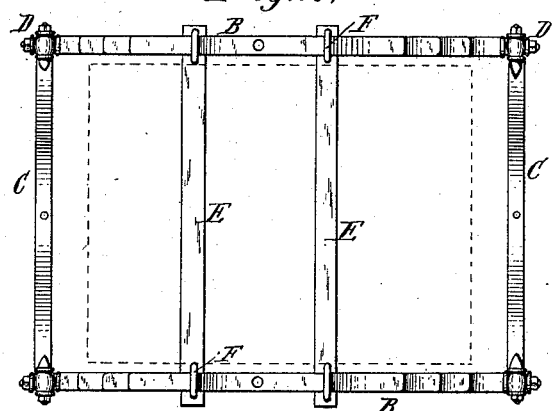
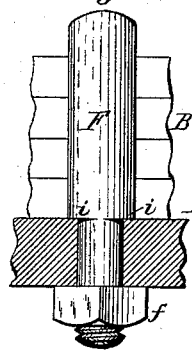
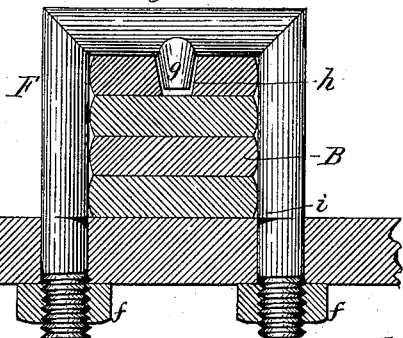
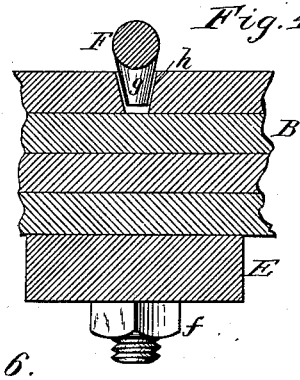
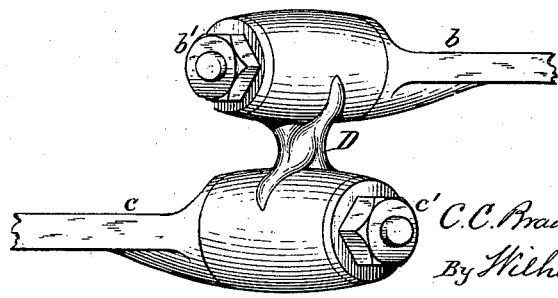
Witnesses:
Theo. L. Popp
Geo. E. Pittman
C. C. Bradley, Inventor.
By Wilhelm & Bonner,
Attorneys.

UNITED STATES PATENT OFFICE.

CHRISTOPHER COLUMBUS BRADLEY, OF SYRACUSE, NEW YORK.

VEHICLE-SPRING.

SPECIFICATION forming part of Letters Patent No. 294,190, dated February 26, 1884.

Application filed December 10, 1883. (No model.)

*To all whom it may concern:*

Be it known that I, CHRISTOPHER C. BRADLEY, of the city of Syracuse, in the county of Onondaga, in the State of New York, have invented a new and useful Improvement in Carriage-Springs, of which the following is a specification.

This invention relates to an improvement in that class of carriage-springs which are composed of side springs and end springs connected together at their ends by couplings; and the object of this invention is to connect the side springs to the body or box of the wagon or carriage in such manner that a secure connection is established between the springs and the box, while the side springs are not weakened to any appreciable extent, and permitted to move freely as the body or box rises and falls.

My invention consists, to that end, of the improvements which will be hereinafter fully set forth, and pointed out in the claims.

In the accompanying drawings, Figure 1 represents a side elevation of my improved carriage-spring. Fig. 2 is a top plan view thereof, with the outlines of the box or body shown in dotted lines. Fig. 3 is a vertical cross-section, on an enlarged scale, of the side spring at a point where it is attached by the clip to the body or box of the vehicle. Fig. 4 is a longitudinal section at right angles to Fig. 3. Fig. 5 is a side elevation of the clip. Fig. 6 is a perspective view of the coupling whereby the ends of the side and end springs are connected.

Like letters of reference refer to like parts in the several figures.

A represents the body or box of the wagon; B B, the side springs; C C, the end springs, and D the couplings whereby the ends of the end springs are connected with the ends of the side springs. The couplings D are each provided with two holes arranged in different parallel planes at right angles to each other, and adapted to receive trunnions $b$ $c$, formed at the ends of the side and end springs, and secured by screw-nuts $b'$ $c'$, whereby the ends of the springs are securely connected and each spring is permitted to move freely as it is bent. E E are cross-bars secured to the under side of the body or box A of the vehicle, and connected to the side springs, B, by clips F, which latter straddle the springs and are secured thereto by screw-nuts $f$. The clips F are provided with studs or projections $g$, which enter openings $h$ in the springs, whereby the clips are held against longitudinal displacement on the springs, and the springs are at the same time permitted to move freely as they are bent. The studs $g$ penetrate only one of the leaves of the spring, preferably the short leaf, whereby the original strength of the spring is substantially retained and the shearing action of the several leaves of the spring is avoided, which takes place when a fastening bolt or rivet extends through the spring at a distance from the middle thereof. The studs $g$ have sufficient play in the openings $h$, as represented in Figs. 3 and 4, to permit of the requisite rocking movement of the side springs within the clips F. The legs of the clips F are provided with shoulders $i$, against which the cross-bars E are drawn by the screw-nuts $f$, so that the pressure of the screw-nuts is received by the shoulders $i$ when the screw-nuts are tightened, leaving the springs free in the clips, and permitting the springs to play freely during the movements of the vehicle. The side springs are by this means connected with the body or box of the vehicle in such manner as to permit of the requisite free movement of the side springs within the fastening devices whereby they are attached to the body; and as the side springs are connected by a movable joint with the end springs, each member of the system of springs on which the body is supported moves freely in adapting itself to the movements of the carriage-body, and all the members are at the same time permanently connected, whereby a strong, substantial, and easy-riding spring is produced.

I claim as my invention—

1. The combination, with a carriage-body and carriage-spring, of a clip rigidly secured to the carriage-body and constructed with a projection or stud fitted loosely in a recess in the spring, whereby the spring is held in place, while being permitted to rock in the clip in adjusting itself to the movements of the carriage-body, substantially as described.

2. The combination, with the carriage-body, of end springs, C C, side springs, B B, connected with the end springs by couplings D, and clips F, secured to the carriage-body and having projections $g$, loosely fitted in openings or depressions $h$ in the side springs, whereby the springs are held in place, and at the same time permitted to move in the clips, substantially as described.

Witness my hand this 26th day of November, 1883.

CHRISTOPHER COLUMBUS BRADLEY.

Witnesses:
CALVIN S. BUNNELL,
ORLANDO C. WEST.